United States Patent [19]

Satorius et al.

[11] 4,397,029
[45] Aug. 2, 1983

[54] LEAST SQUARES ADAPTIVE LATTICE EQUALIZER

[75] Inventors: Edgar H. Satorius, Long Beach; James D. Pack; Mark J. Shensa, both of San Diego, all of Calif.

[73] Assignee: The United States of America as represented by the Secretary of the Navy, Washington, D.C.

[21] Appl. No.: 235,213

[22] Filed: Feb. 17, 1981

[51] Int. Cl.³ .............................................. H04L 25/03
[52] U.S. Cl. ...................................... 375/13; 375/14; 375/18; 375/553
[58] Field of Search .................................. 375/12–14; 333/18; 364/724, 825, 553, 827

[56] References Cited

U.S. PATENT DOCUMENTS

| | | | |
|---|---|---|---|
| 3,723,911 | 3/1973 | Forney, Jr. ............................ | 333/18 |
| 4,004,226 | 1/1977 | Qureshi et al. ........................ | 375/13 |
| 4,253,184 | 2/1981 | Gitlin et al. ............................ | 375/14 |
| 4,328,585 | 5/1982 | Monsen ................................. | 375/13 |

*Primary Examiner*—Jin F. Ng
*Attorney, Agent, or Firm*—Robert F. Beers; Ervin F. Johnston; Harvey Fendelman

[57] ABSTRACT

Equalizer apparatus is provided which includes a number of successively coupled lattice stages, each of the stages comprising a selected configuration of adjustable electrical components, the input to the first stage of the successively coupled lattice stages comprising the output of a data transmission channel. The equalizer apparatus further includes a subtractor device coupled to the lattice stages for providing a succession of error terms, each of the error terms comprising an accumulation of the squares of a number of error quantities, each of the error quantities indicating the difference between an undistorted training signal, in a sequence of training signals which are received by the subtractor device, and the same training signal after it has travelled through the data transmission channel and is received by the lattice stages. A component adjust device is coupled to respective components of the lattice stages for iteratively adjusting the components in accordance with a least squares procedure, the components being adjusted each time a training signal is received by the subtractor device and the lattice stages, the iterative adjustments continuing so that at the conclusion of the training sequence, the subtractor device generates an error term which is within a prespecified error limit.

15 Claims, 4 Drawing Figures

LEAST SQUARES ADAPTIVE LATTICE EQUALIZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to the field of equalizer or equalization apparatus, that is, apparatus which is located at the receiving end of a data transmission channel and which comprises an inverse model thereof. More particularly, the invention pertains to equalizer apparatus which has a very rapid convergence time, i.e., which is capable of being set up as an inverse model of a data transmission channel in a very short time period. Even more particularly, the invention pertains to equalizer apparatus which is useful for employment with a data transmission channel which is subject to fading, i.e., frequent or continual change in channel characteristics.

As is well known in the art, an equalizer is a type of filter, a filter being a device which is capable of providing a desired output in response to a specified input. The input to an equalizer comprises data which has been distorted by passage through a data transmission channel, and the desired equalizer output is the data in its original, undistorted form. Equalizer devices, which were invented in the mid-1960's, may be set up to provide inverse models of data transmission channels with which they are used, as aforementioned, and are located at the receiving ends thereof. When channel distorted data is coupled into an equalizer, it is inversely distorted thereby, so that the equalizer output comprises the data in undistorted condition.

In order to set up, or "train", an equalizer as an inverse transmission channel model, a sequence of prespecified signals, referred to as training signals, are coupled directly to the equalizer, so that they are received thereby without distortion. By determining the error between the undistorted and channel distorted (i.e. transmitted) forms of successive training signals, and by adjusting the equalizer in relation to such errors, the equalizer is adapted to become the aforementioned inverse channel model by the time the training signal sequence concludes.

Presently available equalizers generally comprise configurations of adjustable electrical components, together with some means for varying respective parameters of the components in accordance with successive training signal errors. Such means include calculation or like devices for performing a series of mathematical computations in response to each training signal error. It will be readily apparent that the efficiency of an equalizer device is closely related to the length of the training signal sequence which is required to set the equalizer up, and also to the number and complexity of the computations which are required per training signal error.

Efficiency of operation is very important in an equalizer device for reasons of cost and complexity of fabrication. Efficiency may be even more important as a determinant of equalizer convergence time, which, as aforementioned, is the time that is required to adapt an equalizer to inversely model the characteristics of a particular data transmission channel. Covergence time is especially important where the data transmission channel is subject to continual variations in channel characteristics, and data is transmitted at a very high rate of speed. If an equalizer employed with such channel is incapable of adapting or converging to the new channel characteristics with sufficient speed, significant amounts of transmitted data may be lost.

By means of their invention, Applicants provide significant improvements over the prior art in both the convergence time and operational efficiency of equalizer apparatus. Such apparatus is considered to have particular utility in the operation of a communication system wherein data is transmitted at a rapid rate through a channel which is subject to frequent or continual fading. However, it is not intended to limit the invention to such application.

SUMMARY OF THE INVENTION

In the present invention, equalizer apparatus is provided which includes a number of successively coupled lattice stages, each of the lattice stages comprising a selected configuration of adjustable electrical components. The input to the first lattice stage of the successively coupled lattice stages comprises the output of a data transmission channel. The apparatus further includes means for coupling a given one of the discrete training signals in a sequence of discrete training signals to the first error generating means in a succession of error generating means, the given training signal being directly coupled to the first error generating means at the same time that it is coupled to the first lattice stage through the data transmission channel. Each of the error generating means has a first and a second input, and comprises means for generating an error quantity which represents the difference between its first and second inputs. The first input to a given one of the error generating means comprises an output of one of the lattice stages, and the second input thereto comprises the error quantity which is generated by the error generating means which immediately precedes the given error generating means in the aforementioned succession. A component adjust means, which is coupled to respective components of the lattice stages and which receives each of the error quantities, is provided for adjusting respective components. Adjustments are made by the adjust means according to a least square procedure so that the error quantity of a specified error generating means is less than the error quantity of any error generating means which precedes the specified error gennerating means in the aforementioned succession.

Preferably, the apparatus includes a summation means for providing the sum of all of the lattice stage outputs which comprise second stage inputs to the error generating means, such sum comprising the output of the equalizer apparatus. Switching means are provided for coupling the equalizer apparatus output to the first error generating means in the aforementioned succession, as a second input thereto, at the conclusion of the sequence of training signals.

Preferably also, the component adjust means comprises a number of component adjust elements, each of the component adjust elements being coupled to the components of one of the lattice stages. The component adjust element coupled to a particular lattice stage comprises means for iteratively adjusting respective components of the particular lattice stage to iteratively reduce the error quantity of a particular error generating means, the particular error generating means receiving its first input from the particular lattice stage. Each of the iterative adjustments are made in response to outputs of the lattice stage which immediately precedes the particular lattice stage in the successive coupling of lattice stages, and are also made in response to the error quantity which is provided by the error generating means which immediately precedes the particular error generating means in the succession of error generating means.

In a preferred embodiment of the invention, each of the training signals is a discrete digital signal, and if the data transmitted through the data transmission channel is in analog form, an analog to digital converter is coupled between the channel output and the equalizer apparatus. Each of the component adjust elements includes means for storing prespecified initial conditions in digital form, and further includes means for processing and storing digital-form error quantities and digital-form lattice stage outputs.

OBJECTS OF THE INVENTION

An important object of the present invention is to significantly reduce the convergence time and to improve the computational efficiency of equalizer apparatus.

Another object is to provide an equalizer apparatus which adapts to transmission channel fading without being retrained, i.e., without receiving a new sequence of training signals.

Another object is to provide an equalizer for use with a communication channel which transmits data at a very fast rate, the equalizer being capable of adapting to changes in channel characteristics with sufficient rapidity that loss of transmitted data is prevented.

Another object is to provide an equalizer comprising a number of lattice stages connected in cascade relationship, each stage being capable of fabrication as a discrete integrated circuit chip to enable simplified construction of an equalizer of any order.

These and other objects of the invention will become more readily apparent from the ensuing specification when taken together with the drawings.

DETAILED DESCRIPTION OF THE PREFERRED EMBODIMENT

Figure 1:
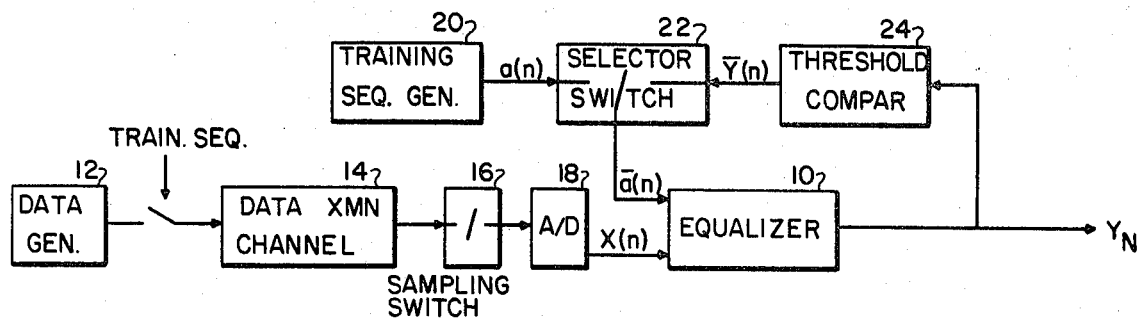
FIG. 1 is a schematic view showing a data transmission system which includes an embodiment of the invention.

Referring to FIG. 1, there is shown a communication system which employs an equalizer 10, equalizer 10 embodying the principles of the present invention. The communication system includes a data generator 12 for providing data in either analog or digital form, and a data transmission channel 14 for conveying the data from a first location to a second location. Data transmission channel 14 may comprise, for example, a microwave transmission channel which is subject to continual fading, or change in channel characteristics. The data generator may be a pulse amplitude modulation (PAM) transmitter, which provides a sequence of signals having amplitudes selected from a range of discrete amplitude levels. However, such reference to microwave transmission channels and pulse amplitude modulation is by no means intended to limit either the scope or the use of the invention. To the contrary, it is anticipated that the equalizer apparatus of the invention is adaptable for employment with most other conventional data transmission path or modulation technique.

Referring further to FIG. 1, there is shown a sampling switch 16, situated at the second location and receiving the output of channel 14. Such output comprises the data originally provided by generator 12 at the first location, as distorted by channel 14. Sampling switch 16 operates to provide a series of samples of the channel 14 output, such samples being coupled to an analog to digital (A/D) converter 18. The output of A/D converter 18 therefore comprises a sequence of data samples $X(n)$, where n is the nth sample, and $X(n)$ is the output of channel 14, in the form of a digital number, at the time that the nth sample is taken.

Each channel output sample $X(n)$ is coupled as an input to equalizer 10. In order to initially converge equalizer 10 to an inverse model of channel 14, a training sequence generator 20 is provided, which generates a sequence of training signals $a(n)$. Each training signal comprises, for example, the digital or binary representation of one of the discrete amplitude levels which may occur in a PAM transmission system. A switch 22 selectively couples the training signal sequence directly to equalizer 10 as an input $\bar{a}(n)$, the training sequence also being coupled through transmission channel 14 to equalizer input $X(n)$ during training. The timing of training signals coupled to inputs $\bar{a}(n)$ and $X(n)$ is such that a particular signal arrives at the $\bar{a}(n)$ input, in an undistorted form, at the same time that it arrives at the $X(n)$ input, after being distorted by the channel. Various techniques for the synchronous generation and transmission of a training signal, to achieve simultaneous reception of the undistorted and channel distorted forms thereof by the equalizer, are well known in the communication arts, and are therefore not described in detail herein. In one such technique, a transmission of data through channel 14 is preceded by a synchronizing indicator, which is followed by the sequence of training signals. The synchronizing indicator is received by the training sequence generator 20, and causes successive training signals to be read out of a memory device included therein.

The errors between the undistorted and channel distorted forms of successive training signals are employed to converge equalizer 10, as hereinafter described in greater detail, to a model of a transmission channel which is inverse to channel 14. At the conclusion of the training sequence, the output of equalizer 10, $Y(n)$, is equal to the data provided by generator 12, to within a prespecified residual error. $Y(n)$ is coupled to a threshold comparator device 24, which is structured to recognize a value of $\bar{Y}(n)$ which is equal to one of the aforementioned PAM amplitude levels, plus a possible residual error. The output $\bar{Y}(n)$ of threshold comparator 24 comprises recognized PAM amplitude levels, the residual error being removed therefrom. After equalizer 10 has been initially converted by a training signal, selector switch 22 couples threshold comparator output $\bar{Y}(n)$ to equalizer input $\bar{a}(n)$. Thereafter, the equalizer is reconverged, to adapt to changing channel characteristics, by the errors between successive $\overline{Y}(n)$ outputs and $X(n)$ inputs. It is unnecessary to couple another training signal sequence through the channel to reconverge equalizer 10, whereby there is no need to interrupt the flow of real data through channel 14 after initial convergence is achieved. Because threshold output $\bar{y}(n)$ is used as input $\bar{a}(n)$ after training equalizer 10 is referred to as a decision directed equalizer.

Figure 2:
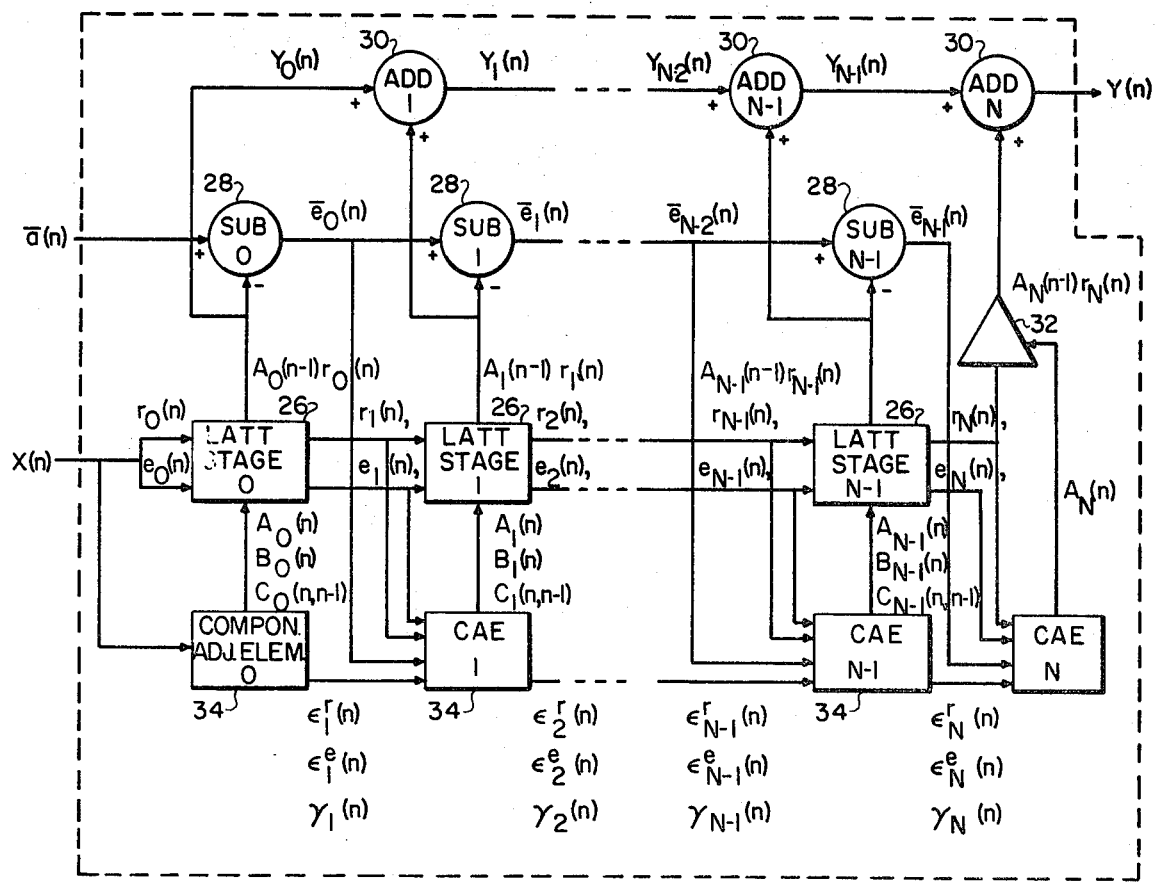
FIG. 2 is a schematic diagram showing the embodiment of FIG. 1 in some detail.

Referring to FIG. 2, there is shown equalizer 10 provided with N lattice stages 26, which are successively coupled in cascade relationship. N is the order of equalizer 10 and is usefully between 5 and 21. Lattice stage m provides outputs $r_{m+1}(n)$ and $e_{m+1}(n)$, for $m=0, 1 \ldots N-1$, and the inputs thereto comprise $r_m(n)$ and $e_m(n)$. The inputs to lattice stage 0, $r_o(n)$ and $e_o(n)$, comprise equalizer input $X(n)$.

In addition to $r_{m+1}(n)$ and $e_{m+1}(n)$, the mth lattice stage generates an output $A_m(n-1)r_m(n)$, which is coupled to a subtraction or subtractor element 28, as an input thereto, elements 28 being respectively referenced in FIG. 2 as subtractors 0 to $N-1$. $A_m(n-1)$ is a coefficient which comprises the gain of the mth lattice stage. Subtractor elements 28 are coupled in a succession, so that for $m=1, 2 \ldots N-2$, the output of subtractor m, $\bar{e}_m(n)$, comprises a second input to subtractor $m+1$. $\bar{e}_m(n)$ is an error quantity which indicates the difference between subtractor inputs $\bar{e}_{m-1}(n)$ and $A_m(n-1)r_m(n)$. For subtractor 0, the second input comprises equalizer input $\bar{a}(n)$, the output thereof therefore being $\bar{e}_o(n) = \bar{a}(n) - A_o(n-1)r_o(n)$.

In addition to providing inputs to subtractor 28, the lattice stage outputs $A_m(n-1)r_m(n)$ provide inputs to adder elements 30, which are shown in FIG. 2 to be connected in a succession, and to be respectively referenced as adders 0 to $N-1$. An additional adder 30, referenced as adder N, is also shown receiving the quantity $A_N(n-1)r_N(n)$ from an amplification element 32. From the interconnections of adders 30, it is clear that the output of adder N comprises $$\sum_{m=0}^{N} A_m(n-1) r_m(n),$$

which is the equalizer $Y(n)$.

Referring further to FIG. 2, there is shown a series of component adjust elements 34, connected in cascade relationship, which are respectively referenced in FIG. 2 as component adjust elements 0 to $N-1$. The input to component adjust element 0 is $X(n)$, and for $m=1, 2 \ldots N-1$, inputs to the mth adjust element comprise $r_m(n)$, $e_m(n)$, and $\bar{e}_{m-1}(m)$, and also scalar quantities $\epsilon_m{}^r(n)$, $\epsilon_m{}^e(n)$ and $\gamma_m(n)$. For $m=0, 1 \ldots N-1$, the outputs of the mth adjust element comprise quantities $\epsilon_{m+1}{}^r(n)$, $\epsilon_{m+1}{}^e(n)$ and $\gamma_{m+1}(n)$, and also coefficients $A_m(n)$, $B_m(n)$ and $C_m(n, n-1)$. As aforementioned, $A_m(n)$ is the gain coefficient of the mth lattice stage 26. $B_m(n)$ and $C_m(n, n-1)$ are coefficients of multiplication elements contained in lattice stage m, which are hereinafter described.

Component adjust elements 34 comprise digital computational devices which are respectively operated to converge equalizer 10 by iteratively calculating values of $A_m(n)$, $B_m(n)$ and $C_m(n, n-1)$, in accordance with the classical least squares problem. That is, when the nth equalizer inputs, or data samples, $X(n)$ and $\bar{a}(n)$ are received by the equalizer, respective component adjust elements compute values for coefficients $A_m(n)$, $B_m(n)$ and $C_m(n, n-1)$, for $m=0, 1 \ldots N-1$. The coefficients are then cooperatively used to minimize an accumulation of the squared errors between actual and desired equalizer outputs. From the interconnections of respective components of the equalizer shown in FIG. 2, it may be seen that the accumulation of errors when the nth data samples $X(n)$ and $\bar{a}(n)$ are received is $\bar{e}_{N-1}(n)$, where $$\bar{e}_{N-1}(n) = \bar{a}(n) - \sum_{m=0}^{N-1} A_m(n - 1)r_m(n) \qquad \text{Eqn. 1}$$

During the time between the nth and n+1th data samples, the mth component adjust element computes and couples to the mth lattice stage the coefficients $A_m(n)$, $B_m(n)$, and $C_m(n, n-1)$. However, from Equation 1, it is seen that the error accumulation up to such time is determined in part by respective coefficients $A_m(n-1)$. Also, as described hereinafter, each quantity $r_m(n)$ for Equation 1 is derived from coefficients $B_m(n-1)$ and $C_m(n-1, n-2)$.

In addition to computing coefficients $A_m(n)$, $B_m(n)$ and $C_m(n, n-1)$ during the time between the nth and N+1th input samples, each component adjust element m, in accordance with a least squares adaptive lattice equalizer (LSALE) algorithm, generates scalar quantities $\epsilon_{m+1}{}^e(n)$, $\epsilon_{m+1}{}^r(n)$, and $\gamma_m$ and couples them to adjust element $m+1$. Such quantities are required by adjust element $m+1$ in determining coefficients $A_{m+1}$, $B_{m+1}$, and $C_{m+1}$. Adjust element m also calculates and stores quantities $K_m(n)$ and $\bar{K}_m(n)$, for use in determining coefficients $A_m(n+1)$, $B_m(n+1)$ and $C_m(n+1)$.

From the LSALE algorithm, the various quantities calculated by the mth component adjust element, during the time between the nth and n+1th data samples, have the following relationships for $m=1, \ldots N-1$.

$$A_m(n) = \frac{\bar{K}_m(n)}{\epsilon_m{}^r(n)} \qquad \text{Eqn. 2}$$

$$B_m(n) = \frac{K_m(n)}{\epsilon_m{}^e(n)} \qquad \text{Eqn. 3}$$

$$C_m(n, n - 1) = \frac{K_m(n)}{\epsilon_m{}^r(n - 1)} \qquad \text{Eqn. 4}$$

$$\epsilon_{m+1}^r(n) = \epsilon_m{}^r(n - 1) - \frac{K_m{}^2(n)}{\epsilon_m{}^e(n)} \qquad \text{Eqn. 5}$$

$$\epsilon_{m+1}^e(n) = \epsilon_m{}^e(n) - \frac{K_m{}^2(n)}{\epsilon_m{}^r(n - 1)} \qquad \text{Eqn. 6}$$

$$\gamma_m(n) = \gamma_{m-1}(n) + \frac{\{(1 - \gamma_{m-1}(n))r_m(n)\}^2}{\epsilon_m{}^r(n)} \qquad \text{Eqn. 7}$$

$$K_m(n) = WK_m(n - 1) + (1 - \gamma_{m-1}(n - 1))e_m(n)r_m(n - 1) \qquad \text{Eqn. 8}$$

$$\bar{K}_m(n) = W\bar{K}_m(n - 1) + (1 - \gamma_{m-1}(n))\bar{e}_{m-1}(n)r_m(n) \qquad \text{Eqn. 9}$$

For $m=0$, the following relationships are specified by the LSALE algorithm:

$$\epsilon_o{}^r(n) = \epsilon_o{}^e(n) = W \epsilon_o{}^e(n - 1) + X^2(n) \qquad \text{Eqn. 10}$$

-continued $$\gamma_{-1}(n) = \gamma_{-1}(n-1) = 0 \qquad \text{Eqn. 11}$$

Prior to n=0, i.e., before the first data samples X(n) and $\bar{a}(n)$ are received, the following initial conditions are employed:

$$\epsilon_m^e(-1) = \epsilon_m^r(-2) = \epsilon_m^{(r)}(-1) = \delta \qquad \text{Eqn. 12}$$

$$r_m(-1) = K_m(-1) = \bar{K}_m(-1) = \gamma_m(-1) = 0 \qquad \text{Eqn. 13}$$

In the above equations, $\delta$ is a small positive constant. W is a weighting factor which is selected to ensure that in the accumulation of squared errors, the most recent errors are given the greatest significance in implementing the LSALE algorithm.

Each of the component adjust elements usefully comprises a configuration of digital devices of the type which are conventionally employed in making arithmetic computations, such as adders, shift registers, data selection devices, and programmable read only memories (PROM's). Specific digital devices for use in an adjust element, and interconnections thereof which are sufficient to calculate coefficients $A_m(n)$, $B_m(n)$ and $C_m(n, n-1)$, will readily occur to those of skill in the art, given Equations 2-13 together with the respective inputs to the adjust elements which are shown in FIG. 2. A PROM device may be included in adjust element m which is selectively programmed to direct a sequence of arithmetic computation, data storage, and data retrieval operations to calculate the various quantities of Equations 2-13. Some of the calculations are stage recursive, that is, they require input data from a previous adjust element, comparator or lattice stage. Some of the calculations are time recursive, that is, they require input data which is derived from previous equalizer input samples.

A component adjust element N is similar or identical to adjust elements 1 through N−1, and receives the same input quantities. However, the only output provided by component adjust element N is coefficient $A_N(n)$, the gain of amplification element 32 during the next following sampling time.

From Equations 2-13 it will be seen that in order to determine coefficients $A_m(n)$, $B_m(n)$ and $C_m(n, n-1)$, it is necessary for component adjust element m to receive inputs $r_m(n)$ and $e_m(n)$. Such quantities may be obtained according to the LSALE algorithm, from the following relationships:

$$r_{m+1}(n) = r_m(n-1) - B_m(n-1)e_m(n) \qquad \text{Eqn. 14}$$

$$e_{m+1}(n) = e_m(n) - C_m(n-1, n-2)r_m(n-1) \qquad \text{Eqn. 15}$$

Figure 3:
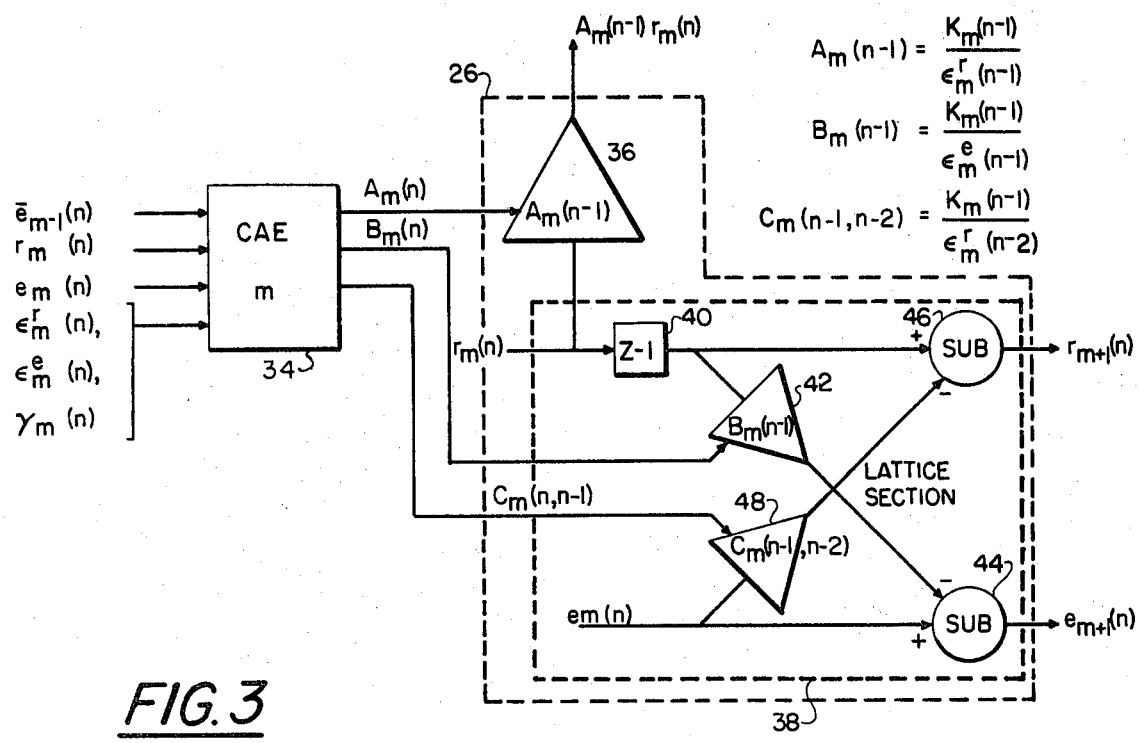
FIG. 3 is a schematic diagram showing a lattice stage for the embodiment of FIG. 1.

Given that $e_0(n)$ and $r_0(n)$ are both equal to X(n), as aforementioned, each of the remaining quantities $r_m(n)$ and $e_m(n)$ can be found from Equations 14 and 15. In order to minimize convergence time, the equations may be implemented physically, rather than be solved through mathematical computations. To achieve such physical implementation, the mth lattice stage 26, as shown by FIG. 3, comprises a multiplier or amplification element 36, which receives input $r_m(n)$, and a lattice section 38, which receives both inputs $r_m(n)$ and $e_m(n)$. When X(n) and $\bar{a}(n)$ are received, that is, at the beginning of the time between the nth and n+1th data samples, the gain provided by amplification element 36 is $A_m(n-1)$, which is determined during the period between samples n−1 and n. By the time that data samples n+1 are received by the equalizer 10 has operated to generate each value $A_m(n)$, and to set the gain of amplification element 36 of the mth stage thereto.

Referring further to FIG. 3, there is shown lattice section 38 including a delay element 40, which receives $r_m(n)$ and delays it by one sampling time, the output of delay element 40 being coupled to a subtractor or subtracting element. The output of delay element 40 is also coupled, through multiplier 42, to a subtractor 44. By setting the coefficient of multiplication of multiplier 42 to $B_m(n-1)$, which is provided by component adjust element m during the previous sampling time, and by coupling input $e_m(n)$ to subtractor 44, the output of subtractor 44 comprises the value of $e_{m+1}(n)$ which is specified by Equation 15.

In like manner, input $e_m(n)$ is coupled to subtractor 46 through multiplier 48, the coefficient thereof being $C_m(n-1, n-2)$, which is calculated by adjust elements m during previous sampling times. The output of subtractor 42 therefore comprises the value of $r_{m+1}(n)$ which is specified by Equation 14.

It will be readily apparent that when all of the lattice stages 0 to N−1 are joined together as shown in FIG. 2, the respective lattice sections 38 thereof together form a lattice, which rapidly generates each of the quantities $r_m(n)$ and $e_m(n)$, each time the nth data sample is received by equalizer 10. Since the $r_m(n)$ and $e_m(n)$ are generated by physical operation of respective lattice sections, rather than by a series of mathematical calculations as aforementioned, the number of calculations which must be performed in order to determine each of the coefficients $A_m(n)$, $B_m(n)$ and $C_m(n, n-1)$ is significantly reduced. Equalizer 10 therefore provides enhanced operational efficiency, and also enables convergence times to become very short.

The series of operations of respective component adjust elements and lattice sections in providing coefficients $A_m(n)$, $B_m(n)$ and $C_m(n, n-1)$, in response to the nth data samples, is referred to as an iteration. During equalizer convergence, successive iterations of equalizer 10 cause error term $\bar{e}_{N-1}(n)$ to be steadily diminished to within a prespecified limit. Error term $\bar{e}_{N-1}(n)$ is determined in part by the order N of equalizer 10, the error term being decreased as N is increased.

Figure 4:
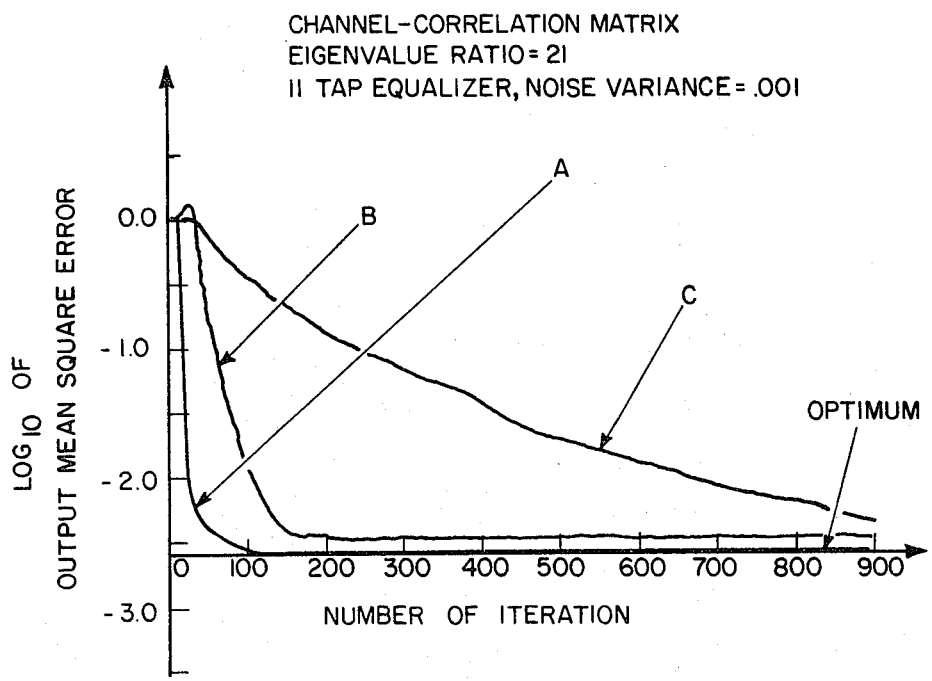
FIG. 4 is a graphical presentation for comparing the relative efficiencies of the embodiment of FIG. 1 with present state of the art equalizer devices.

Referring to FIG. 4, there is shown data which compares the numbers of iterations performed by several different types of equalizer devices in order to reduce their respective error terms to a particular level. Curve A of FIG. 4 comprises data obtained from operation of equalizer 10, which is structured according to the LSALE algorithm as aforementioned. Curve B comprises data obtained from operation of an equalizer device structured according to a gradient lattice algorithm, and curve C represents data obtained from the operation of an equalizer structured according to a gradient tap delay line equalizer algorithm. The value of $\delta$ employed in structuring the equalizer from which the data for curve A is obtained is equal to 0.001, and the value of W is equal to 1.

It is seen from FIG. 4 that the number of iterations required to reach a small value of error, and therefore to achieve convergence, is substantially less for equalizer 10.

It is anticipated that equalizer 10 may very usefully be fabricated by incorporating each lattice stage m and component adjust element m in one discrete integrated circuit ship. An equalizer of any desired order could thereby be readily constructed, simply by selecting and consecutively joining the desired number of chips. In a modification of the invention, the entire equalizer may be formed upon a single integrated circuit ship, with some of the computational devices required for component adjust elements 32 being shared in common amongst them. In another modification of the invention, some or all of the calculations required to converge equalizer 10 may be performed by a digital computer device, programmed in accordance with Equations 2–15.

Obviously, many modifications and variations of the present invention are possible in the light of the above teachings, and it is therefore understood that within the scope of the disclosed inventive concept, the invention may be practiced otherwise than as specifically described.

What is claimed is:

1. Equalizer apparatus comprising:
a number of successively coupled lattice stages, each of said stages comprising a selected configuration of adjustable electrical components, the input to the first stage of said successively coupled lattice stages comprising the output of a data transmission channel;
error generating means coupled to said lattice stages for providing a succession of error terms, each of said error terms comprising an accumulation of error quantities, each of said error terms representing the difference between an undistorted training signal, in a sequence of undistorted training signals which are received by said error generating means, and the same training signal after it has traveled through said data transmission channel and been received by said lattice stages; and
component adjust means for iteratively adjusting said electrical components in response to said training signals, said error generating means providing an error term which is within a prespecified limit when said components are iteratively adjusted in response to the final training signal in said sequence.

2. The apparatus of claim 1 wherein each of said lattice stages comprises:
a first multiplier element for amplifying an input to said first multiplier element by a first multiplier coefficient; and
a lattice section which includes second and third multiplier elements, the lattice sections of all of said lattice stages of said apparatus being coupled in cascade relationship to form a lattice.

3. Equalizer apparatus comprising:
a number of successively coupled lattice stages, each of said stages comprising a selected configuration of adjustable electrical components, the input to the first stage of said successively coupled lattice stages comprising the output of a data transmission channel, each of said lattice stages comprising:
a first multiplier element for amplifying an input to said first multiplier element by a first multiplier coefficient; and
a lattice section which includes second and third multiplier elements, the lattice sections of all of said lattice stages of said apparatus being coupled in cascade relationship to form a lattice;
error generating means coupled to said lattice stages for providing a succession of error terms, each of said error terms comprising an accumulation of error quantities, each of said error terms representing the difference between an undistorted training signal, in a sequence of undistorted training signals which are received by said error generating means, and the same training signal after it has traveled through said data transmission channel and been received by said lattice stages;
component adjust means for iteratively adjusting said electrical components in response to said training signals, said error generating means providing an error term which is within a prespecified limit when said components are iteratively adjusted in response to the final training signal in said sequence, said component adjust means comprising a number of component adjust elements, each of said component adjust elements being coupled to a corresponding lattice section; and
the component adjust element corresponding to a given lattice stage comprising means for performing a series of operations in accordance with a least squares procedure, and in response to one of said training signals, to generate multiplier coefficients for the first, second and third multiplier elements of said given lattice stage.

4. The apparatus of claim 3 wherein:
said error generating means comprises a succession of error generating elements, each of said error generating elements having first and second error element inputs and an error element output which comprises one of said error quantities, successive outputs of the final error generating element of said succession comprising said succession of error terms.

5. The apparatus of claim 4 wherein said equalizer apparatus receives digital form data samples at selected intervals, and wherein:
a given one of said lattice stages has first and second lattice stage inputs and first and second lattice stage outputs, said first and second lattice stage inputs comprising outputs of the lattice stage which immediately precedes said given lattice stage in said successive lattice stage coupling, said first and second lattice stage outputs comprising inputs of the lattice stage which immediately follows said given lattice stage in said successive lattice stage coupling; and
each of said component adjust elements comprises means for determining multiplier coefficients for the first, second and third multiplier elements of its corresponding lattice stage during each of said intervals, said determinations being made in accordance with previously received data samples.

6. The apparatus of claim 4 wherein said apparatus includes:
a succession of adder elements, each of said adder elements having an input which comprises the output of one of said error generating elements, the output of the final adder element in said succession of adder elements comprising the output of said equalizer apparatus;
a first training signal generator located at the receiving end of said data transmission channel for providing said sequence of undistorted training signals; and
a selector switch coupled to said first training signal generator, to said equalizer apparatus output and to said error generating means for coupling said equalizer apparatus output to the input of said error generating means at the conclusion of said training signal sequence.

7. The apparatus of claim 6 wherein said apparatus includes;
   a second training signal generator located at the transmission end of said data transmission channel for coupling said sequence of undistorted training signals into said channel; and
   means for synchronizing the operation of said first and second training signal generators so that a given one of said training signals is received by said error generating means in an undistorted form at approximately the time that said given training signal is received by said lattice stages after traveling through said data transmission channel.

8. The apparatus of claim 6 wherein a given one of said lattice sections comprises;
   a delay element receiving a first lattice stage input for delaying said first lattice stage input by an amount of time equal to the interval between two successive training signals in said sequence of training signals;
   a first lattice section substractor element, a first input to said first lattice section subtractor element comprising the output of said delay element;
   the third multiplier element of said given lattice section, the input of said third multiplier element comprising a second lattice stage input, and the output of said third multiplier element being coupled as a second input to said first lattice section subtractor element, the output of said first lattice section subtractor element comprising the difference between said first and second inputs to said first lattice section subtractor element;
   a second lattice section subtractor element, a first input to said second lattice section subtractor element comprising said second lattice stage input; and
   the second multiplier element of said given lattice section, the input to said second multiplier element comprising the output of said delay element, and the output of said second multiplier element being coupled as a second input to said second lattice section subtractor element, the output of said second lattice subtractor element comprising the difference between said first and second inputs to said second lattice section subtractor element.

9. The apparatus of claim 8 wherein said data transmission channel comprises a channel for transmitting data in analog form, and wherein:
   the output of said data transmission channel is coupled, through an analog to digital converter, to first and second lattice stage inputs of the first lattice stage of said successively coupled lattice stages; and
   the component adjust element corresponding to a given lattice stage comprises a device for controllably processing, storing and outputting data in digital form to iteratively generate said multiplier coefficients for the first, second and third multiplier elements of said given lattice stage.

10. The apparatus of claim 9 wherein:
    said component adjust elements and their corresponding lattice stages are incorporated into discrete integrated circuit chips, equalizer apparatus of a selected order being formed by joining together a number of said integrated chips which is equal to said selected order.

11. The apparatus of claim 6 wherein said data transmission channel carries data which is generated in accordance with a pulse amplitude modulation technique, and wherein:
    threshold comparator means is coupled between the output of said equalizer apparatus and said selector switch for responding to one of said equalizer outputs by generating a signal which comprises one of a plurality of discrete signal levels which is employed in said pulse amplitude modulation technique.

12. Equalizer apparatus comprising:
    a number of successively coupled lattice stages, each of said lattice stages comprising a selected configuration of adjustable electrical components, the input to the first lattice stage of said successively coupled lattice stages comprising the output of a data transmission channel;
    means for coupling a given one of the discrete training signals in a sequence of discrete training signals to the first error generating element in a succession of error generating elements, said given training signal being coupled to said first error generating element at the time that said given training signal is coupled to said first lattice stage through said data transmission channel;
    each of said error generating elements having a first and a second input and comprising means for generating an error quantity which represents the difference between its first and second inputs, the first input to a given error generating element comprising the output of one of said lattice stages, the second input to the given error generating element comprising the error quantity generated by the error generating element which immediately precedes the given error generating element in said succession; and
    component adjust means coupled to respective components of said lattice stages and receiving each of said error quantities, said component adjust means comprising means for adjusting said respective components to diminish the error quantity of a given one of said error generating elements to within a prespecified error limit.

13. Equalizer apparatus comprising:
    a number of successively coupled lattice stages, each of said lattice stages comprising a selected configuration of adjustable electrical components, the input to the first lattice stage of said successively coupled lattice stages comprising the output of a data transmission channel;
    means for coupling a given one of the discrete training signals in a sequence of discrete training signals to the first error generating element in a succession of error generating elements, said given training signal being coupled to said first error generating element at the time that said given training signal is coupled to said first lattice stage through said data transmission channel;
    each of said error generating elements having a first and a second input and comprising means for generating an error quantity which represents the difference between its first and second inputs, the first input to a given error generating element comprising the output of one of said lattice stages, the second input to the given error generating element comprising the error quantity generated by the error generating element which immediately precedes the given error generating element in said succession;

component adjust means coupled to respective components of said lattice stages and receiving each of said error quantities, said component adjust means comprising means for adjusting said respective components to diminish the error quantity of a given one of said error generating elements to within a prespecified error limit;

a summation means for providing the sum of all of the lattice stage outputs which comprise said first inputs, said sum comprising the output of said equalizer apparatus; and switching means for coupling said equalizer apparatus output to said first error generating element, as a first input, at the conclusion of said sequence of training signals.

14. The apparatus of claim 13 wherein:

said component adjust means comprises a number of component adjustment elements, each of said component adjustment elements being coupled to the components of a corresponding lattice stage; and the component adjustment element coupled to a particular lattice stage comprising means for iteratively adjusting respective components of said particular lattice stage is iteratively reduce the error quantity of the particular error generating element which receives its first input from said particular lattice stage, each of said iterative adjustments being made in response to outputs of the lattice stage which immediately precedes said particular lattice stage in said successive coupling of lattice stages, and also in response to the error quantity which is provided by the error generating element which immediately precedes said particular error generating element in said succession.

15. The apparatus of claim 14 wherein:

said means for coupling said sequence of discrete training signals including means for generating a sequence of discrete digital signals; and each of said component adjustment elements comprises means for storing prespecified initial conditions in digital form, and for processing and storing error quantities and lattice stage outputs in digital form.

* * * * *